United States Patent [19]

Braeker et al.

[11] Patent Number: 5,505,542
[45] Date of Patent: Apr. 9, 1996

[54] CONCHING MACHINE WITH MULTIPLE ROTORS

[75] Inventors: Willy Braeker, Wil; Werner Kuster, Niederuzwil, both of Switzerland

[73] Assignee: Bühler AG, Uzwil, Switzerland

[21] Appl. No.: 266,197

[22] Filed: Jun. 27, 1994

[30] Foreign Application Priority Data

Jul. 6, 1993 [CH] Switzerland .......................... 02023/93

[51] Int. Cl.⁶ .............................. B01F 7/04; B01F 7/08; A23G 1/10
[52] U.S. Cl. .......................................... 366/299; 366/301
[58] Field of Search .................... 366/66, 83–85, 366/90, 96, 97, 297–301, 312, 324; 99/348

[56] References Cited

U.S. PATENT DOCUMENTS

| | | | |
|---|---|---|---|
| 506,384 | 10/1893 | Werner | 366/301 X |
| 561,298 | 6/1896 | Werner | 366/84 X |
| 1,603,546 | 10/1926 | Kirschbraun | 366/300 X |
| 3,421,740 | 1/1969 | Behrens | 366/298 X |
| 3,797,807 | 3/1974 | Behrens | 366/298 X |
| 3,995,836 | 12/1976 | Carter et al. | 366/300 X |
| 4,269,582 | 5/1981 | Mella . | |
| 4,462,693 | 7/1984 | Buschbom et al. | 366/299 X |
| 4,617,089 | 10/1986 | Ullrich et al. | 366/300 X |
| 4,707,140 | 11/1987 | Mohrlang | 366/300 X |
| 5,148,999 | 9/1992 | Curfman et al. | 366/603 X |
| 5,320,427 | 6/1994 | Callebaut et al. | 99/348 X |
| 5,351,609 | 10/1994 | Muntener | 366/297 X |
| 5,353,696 | 10/1994 | Stadelmann et al. | 366/297 X |
| 5,372,418 | 12/1994 | Biesenberger et al. | 366/85 |

FOREIGN PATENT DOCUMENTS

| | | | |
|---|---|---|---|
| 0518025 | 12/1992 | European Pat. Off. . | |
| 288770 | 5/1914 | Germany . | |
| 1189368 | 3/1965 | Germany . | |
| 1298083 | 6/1969 | Germany | 366/300 |
| 3731907 | 4/1989 | Germany | 366/301 |
| 138191 | 9/1960 | U.S.S.R. | 366/301 |
| 626801 | 8/1978 | U.S.S.R. | 366/97 |

Primary Examiner—Charles E. Cooley
Attorney, Agent, or Firm—Martin A. Farber

[57] ABSTRACT

A conching machine having at least two rotors (6, 7, 10, 10') respectively arranged in a trough compartment (3, 4, 5) of a conching trough (1), with the trough walls (2, 15, 115) of the conching trough (1) of each rotor (6, 7, 10, 10') being arranged as closely surrounding each other. Of the rotors (6, 7, 10, 10') at least one rotor (6, 7) is designed with radially extending blades (8) and at least one further rotor as a cutter rotor (10, 10') with at least one cutting edge (12).

1 Claim, 2 Drawing Sheets

CONCHING MACHINE WITH MULTIPLE ROTORS

FIELD OF THE INVENTION

The invention relates to a conching machine having at least two rotors respectively arranged in a trough compartment of a conching trough, at least one rotor having radially projecting blades, with the walls of the conching trough closely surrounding each other.

BACKGROUND OF THE INVENTION

It has been suggested for a long time to carry out a conching procedure by means of screws in a screw casing. The DE-C-288 770 represents an example for this. According to this proposal, four screws— viewed in cross-section— arranged along the sides of a rectangle are each accommodated in a screw casing, which process the chocolate paste in circulation. When using this arrangement it is stressed that it is essential to press the paste and to press the individual paste particles firmly against each other and to triturate them.

In fact, with the help of such screws a good refining effect can be achieved and high energy can be introduced into the mass. Probably this is the reason why screw devices are suggested for processing chocolate pastes again and again, although they have never really become important on the market. The reason for their lack of importance is presumably not least to be found in the fact that the conching work is not limited to the mere refining of chocolate pastes but that with conventional conching machines, as they have been suggested according to DE-B-1 189 368 with three rotors, a chemico-physical medium exchange is achieved in addition to this mere mechanical effect, since the radially extending blades of these rotors expose continually new surfaces of the chocolate paste under the effect of air, which, on the one hand, enables the intense access of oxygen, and, on the other hand, makes possible the escaping of vapors possibly contained in the paste.

It is an object of the invention to improve the kneading and refining of the paste of a conching machine of the conventional type mentioned above, as it is shown in the application mentioned last, while avoiding agglomerates or lumps, as they may develop e.g. by various ingredients, and thereby to shorten the often considerable conching time.

SUMMARY OF THE INVENTION

According to the present invention, this is achieved in that at least one rotor extending substantially parallel to the other rotor is constructed as a shearing rotor, such as a cutter rotor having at least one cutting edge and/or as a screw rotor. Owing to these measures, the processing of the chocolate paste is optimized with respect to its quality, as practical tests have shown, and, in addition to that, the conching time is considerably shortened, which advantageously reduces the production costs of the chocolate product.

It is preferred to design the cutter rotor as a screw rotor and— in contrast to conventional extruder screws— to drive it with an increased rotational speed of at least 1000 rpm, preferably 1500 up to 3000 rpm, resulting in supplying a relatively high amount of energy.

According to a preferred embodiment of the invention, it is suggested to provide the at least one cutter rotor in a trough compartment arranged in the conching trough at a level relative to the overall height below the trough compartment for the at least one rotor equipped with blades and, if required, also with wiping and refining tools. Along with the further suggested preferred constructional measures provided by the invention that the trough compartment for the screw rotor arranged at a lower level in the conching trough with respect to the overall height is designed open toward one or more trough compartments arranged at a higher level of the rotors equipped with blades, there results an extremely intense material exchange between the individual trough compartments, which advantageously contributes to the increase in quality.

Further it is emphasized regarding the inventive feature mentioned above that it is entirely possible within the scope of the invention to apply screw devices as they have been suggested by the DE-C-28 87 70. These screw devices are designed with a casing having an inlet opening closed over their circumference. However, this constructional design does not result in the intensified exchange of material as it is the case with a trough compartment open on its top side.

The further alternative embodiments, which can also be combined with each other, suggested by the invention in a preferred manner that the at least one cutting tool on the screw helix of a screw rotor driven to a rotation be designed as a sharp cutting edge; that furthermore the cutting edge be designed radially extending, if required, but preferably extending over the circumference, or that between the channels of the screw helix cutting edges projecting therefrom be provided, or that the screw helix be designed interruptedly at least at one place for forming radially extending cutting edges, are particularly advantageous for homogenizing the chocolate paste due to the dissolution of agglomerates developing from added sugar, by way of example. If such a cutting edge is provided on the screw rotor itself, particularly if it is formed by a screw helix extending parallel to the other rotors instead of crosswise therewith, then an uninterrupted wiper design over the length of the respective trough compartment, as it is provided on the blades of the respectively other rotor, will thereby be enabled.

Further additional effects increasing the quality in mixing, kneading and refining the chocolate paste are achieved by the fact that in addition to the measures described above the screw helix may have different pitches, in which case the distance of the screw helix channels preferably in direction of the interior of the conching trough is designed increasingly narrower. The operating times for the mixing, kneading and refining are thereby distinctly shortened in an economically advantageous manner.

According to a further preferred embodiment of the invention, it is suggested that at least one screw or cutter rotor, or the appertaining trough compartment, respectively, extends merely over a partial area of the overall length of the conching trough. Owing to this, the pressing of the material within the trough compartment where the screw rotor is located will be increased in an advantageous manner.

According to a further preferred embodiment of the invention, it is provided that the trough compartment of the cutter or the screw rotor in the interior of the conching trough and opposite to its front wall be closed by a vertical transverse wall or a sloped one, which is preferably also provided for supporting the screw rotor at this end. By arranging this transverse wall, the pressing effect is greatly supported. Particularly the slanted transverse wall directs the material to the tools of the rotor equipped with blades in an advantageous manner.

The conching machine works particularly effectively in a preferred embodiment provided by the invention wherein the length of the cutter or the screw rotor is at least one fourth, at the most half, preferably one third of the overall length of the conching trough.

When arranging a plurality of cutter or screw rotors, they are either provided facing each other in axial direction and/or preferably running parallely to one another according to a further preferred embodiment of the invention. A plurality of screw rotors will be particularly advantageous in a case, where they are of a shorter length than the overall length of the conching trough is. It is well conceivable to design these screw rotors in the manner of double screw extruders. In such a case, trough compartments may be designed which are completely separated from each other, but may also be connected to one another.

The advantageous effects in mixing, refining, etc. of the chocolate paste are achieved in a further modification of the invention in a simple manner by having the trough compartments of all screw rotors end in upward direction in the trough compartments of the rotors equipped with blades if a plurality of cutter or screw rotors are arranged.

The advantageous function of the conching machine provided by the invention will be given particularly in a case where the axes of preferably all rotors are arranged at least approximately parallel to each other.

According to a further preferred embodiment of the invention, it is suggested to provide one, preferably common, motive drive direction for all rotors and to provide that direction of rotation of each rotor equipped with blades and preferably with wiping and refining tools which conveys the chocolate paste from above to the trough compartment or of each cutter or screw rotor. Owing to this, an effective and most simply designed speed control of all rotors most simply designed can be achieved and the flow direction of the material for the working processes can be adjusted or controlled effectively. In this connection, it may be noted that the cutter or screw rotor can well be driven with a high number of revolutions in the sense of the invention, which is rather uncommon for screws in a conveying or pressing device.

BRIEF DESCRIPTION OF THE DRAWINGS

Further details of the invention will result from the following description of embodiments schematically shown in the drawing, illustrating in FIG. 1 an axonometric representation of a conching machine provided by the invention, for which

DETAILED DESCRIPTION OF THE DRAWINGS

Figure 1:
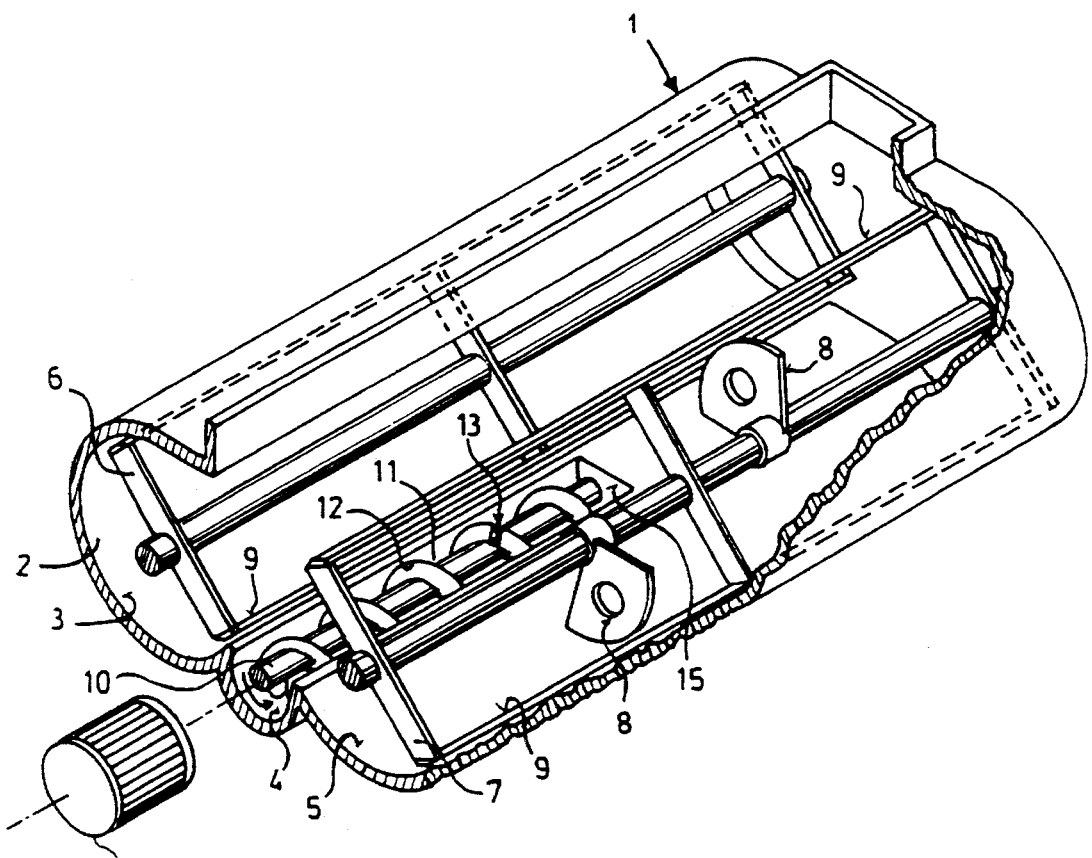
Figure 2:
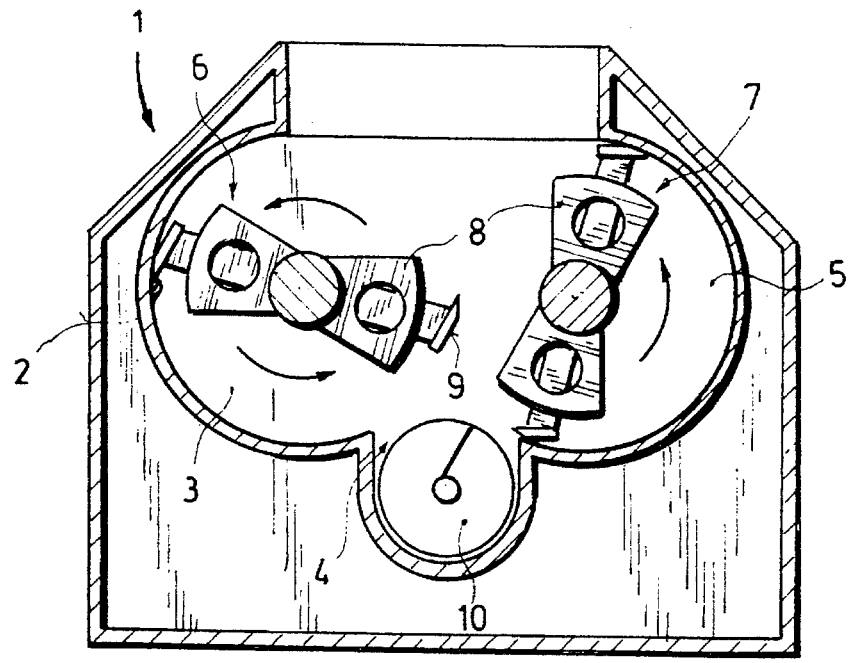
FIG. 2 represents a cross-section.

According to the FIGS. 1 and 2, a trough 1 is provided, whose interior wall 2 is designed for forming three trough compartments 3, 4 and 5 distinctly separated from each other. Each trough compartment closely surrounds one of the rotors each, of which two rotors 6, 7 in FIG. 1 are represented only partially and schematically. The rotors 6 and 7 are equipped with radially extending blades in a conventional manner, of which blade 8, preferably with openings provided therein serves to mix the chocolate paste, whereas blade 9 is designed with wiper and refining tools at its end, which tools cooperate with the respective trough wall 2. These wiper or refining tools may be designed substantially uninterruptedly or continuously over the entire length of the trough, since all rotors extend parallel to each other. When considering the FIGS. 3 and 4, it becomes apparent that the tools 9 act as spattle knife tools at the direction of rotation of the left rotor, and as refining or flat coating tools at the direction of rotation of the right rotor. This representation only serves to illustrate the functions, for normally the orientation of the tools will be the same on both rotors, so that the tools 9 of the two rotors (if a change in the direction of rotation is provided) act as spattle knife tools in the one direction of rotation and as refining or flatting tools in the other direction.

However, it may be mentioned that within the scope of the invention it would be possible to dispense with such refining tools since at least one cutter or screw rotor 10 provided in the trough compartment 4 carries out an intense kneading and refining along with the wall of the trough compartment 4. In such a case, an additional favorable effect will be created when the screw helix of the rotor 10 is provided with sharp cutting edges 11 on its outside. Alternatively or cumulatively to this feature, the screw rotor 10 can also be provided with radially extending cutting edges, e.g. by designing one portion of its length with such cutting tools or by having cutting tools project between the helixes of the rotor 10. A special embodiment may be in that the helix 12 is interrupted at one or several places 13 for forming radially extending cutting edges. Such interruptions also enhance the mixing effect. The drive of the rotors 6, 7 and 10 is effected from the outside in a conventional manner, with merely one motor 14 being represented in FIG. 1, which could also drive the other rotors 6 and 7 via a corresponding gear unit; however, for each rotor 6, 7 and 10 there is conveniently provided one separate motive drive.

For the operation of the conching machine, it is advantageous not to design the trough compartment 4 accommodating the screw rotor 10 with a charging hole at the front side of the trough, as it would principally be conceivable, but to design it open on its top in the manner distinctly apparent from FIG. 1. Owing to this, there results a more intense exchange of chocolate paste between the individual trough compartments 3 to 5.

This exchange of the chocolate pastes takes place particularly intensely in the case of an arrangement having at least three rotors, as it becomes apparent from FIGS. 1 and 2. When using such an arrangement, the rotor 7 is operated in a counter-clockwise manner, so that the radially extending rotating blades, when turning, convey the chocolate mass radially and tangentially downward into the trough compartment 4 of the screw rotor 10. There, the chocolate paste is subjected to a strong pressing, which is further supported by the fact that at the end of the trough compartment 4 an end wall 15 rising up at an angle is provided (FIG. 1). Thus, the mass is pressed against this surface 15, but it may also exit laterally from the upper opening of the trough compartment 4. To support this effect, it may be provided to design the screw helix 12 with a differing pitch over its length, e.g. with narrower helixes against its end facing the wall 15. In such an arrangement, the wall 15 allows to receiving the screw rotor 10 therein, if desired, so that, on the one hand, it can be supported by the outer trough wall and, on the other hand, on the transverse wall 15.

The chocolate material pressed out of the trough compartment 4 by the pressing of the screw rotor 10 is conveniently stripped off by the blades 8 with the wiping tools 9, thus passing from the trough compartment 4 into the trough compartment 3, where it is subjected to a further processing.

In this connection, it becomes apparent that by the axial movement of the screw rotor 10 a still more intense mixing will be achieved, since this axial movement superimposes the movement of the mass between the individual trough compartments 3 to 5.

While FIGS. 1 and 2 show a screw rotor 10 extending merely over one portion of the length of the trough 1, it is well possible within the scope of the invention to provide a screw rotor extending over the entire length of the trough. However, it has been explained above why the cooperation with a transverse wall 15 is advantageous, which transverse wall is conveniently arranged at a distance from the front wall of the trough, which corresponds to at least one fourth, preferably to one third, if necessary, to one half of the length of the trough 1. Accordingly a certain trough length remains in which no screw rotor would take effect as such, for which reason it is advantageous according to FIG. 3 to arrange at least a second screw 10 from the opposite side of the trough 1. Furthermore, it is apparent that the wall 15 is located in a preferred manner about vertically to the axis of the screw rotor 10, but, if required, in the sense of the wall 115 apparent from FIG. 3, it may be situated at an angle deviating from 90° to the axis of the rotor 10.

Figure 3:
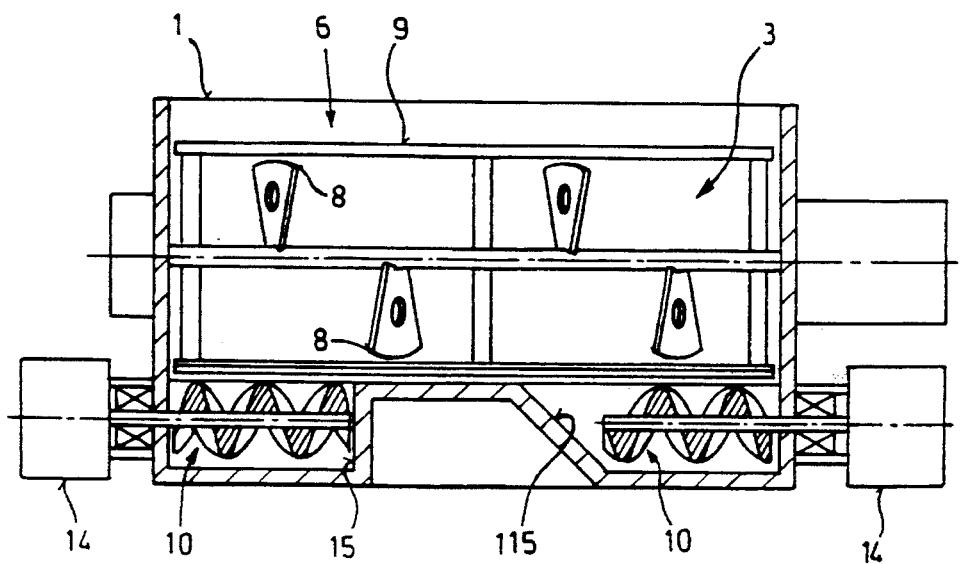
FIG. 3 shows a longitudinal section across a modification of a conching machine provided by the invention.
Figure 4:
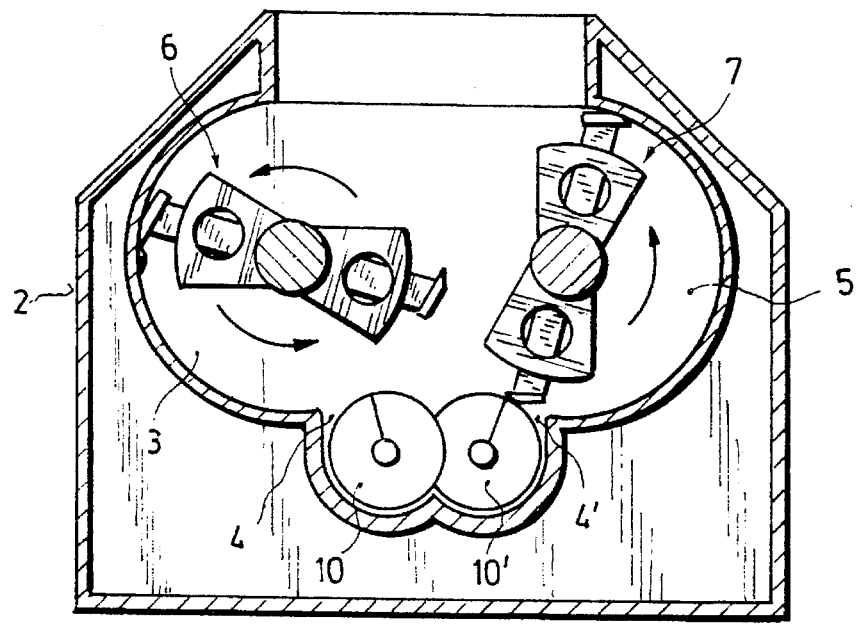
FIG. 4 represents a cross-section of a further embodiment provided by the invention.

Thus, while it is advantageous to provide at least two screw rotors 10, this does not have to take place from opposing sides in the sense of FIG. 3 but it can also be realized in the form of two adjacent screw rotors 10, 10' preferably running parallel to each other in the sense of FIG. 4. According to the representation of FIG. 4, these rotors 10, 10' interengage with each other in order to achieve thereby a more intense kneading of the chocolate paste, but this is not absolutely necessary, since the rotors 10, 10' could also be arranged side-by-side, whereby a gap is formed therebetween. If the rotors 10, 10' are not arranged parallel to each other, they can lie at a small angle to one another, particularly if the screw diameter decreases toward the wall 15 (cf. the previous figures). In each case, however, the direction of rotation of the respective screw rotor 10 is designed in such a manner that the chocolate paste is advantageously conveyed toward the middle of the trough.

As it is apparent, the trough wall forms a separate compartment 4, 4' in the area of either screw rotor 10, 10', with the trough wall forming about a horizontal 3 on the bottom side. However, principally it is also possible to accommodate the two screw rotors 10, 10' in a common trough compartment, although this is not preferred. Furthermore, in the case of an embodiment according to FIG. 4, it is also conceivable to combine it with an embodiment according to FIG. 3 in such a manner that from the two front walls of the trough 1 a respective pair of screw rotors 10, 10' projects into the trough area. It is to be understood that the conveying direction of the rotors facing each other (cf. FIG. 3) will be opposed to one another as a rule, although it would also be conceivable to have the rotors facing each other run in the same conveying direction. In this case, e.g. the wall 115 could represent the feed-in wall for the material and the right wall in FIG. 3, located vertically to the axis of the rotor 10 could define that outlet gap through which the material is pressed out.

Although the screw rotor(s) 10 is/are represented centrally on the bottom side of the trough 1, which is preferred, it would also be possible within the scope of the invention to arrange them on one side in a middle range of the entire height or on top of the trough.

It may be mentioned that with the help of the device shown there is mainly achieved a dissolution of big agglomerates, but that surprisingly the following further effects have become noticeable, for which, at the moment, no reasons can yet be given, which, however, are actually existent and observable:

there takes place a reagglomeration of finest particles, which results in a more favorable volume/surface ratio (specific surface) and reduces the necessary requirement of fat (i.e. the requirement of expensive cocoa butter; and there results a marked decrease in viscosity of the chocolate paste, which corresponds to a relief to the preceding roller work.

What is claimed is:

1. A device for treating chocolate paste comprising:

a trough for containing said chocolate paste extending along a longitudinal axis and including at least first and second trough compartments each having an inner surface which is at least partially cylindrical;

first and second rotor means supported each within one of said compartments, each of said rotor means having a rotor shaft parallel to said longitudinal axis and treating tools extending radially from said rotor shaft to the inner surface of the respective one of said compartments;

at least a third rotor means and a fourth rotor means in ssaid trough extending substantially parallel to said longitudinal axis, and each of said third and said fourth rotor means comprising a rotor shaft and at least one shearing tool;

drive means for driving each of said rotor means; and wherein said third and said fourth rotor means are shorter than said first and said second rotor means and are axially opposite to each other.

\* \* \* \* \*